United States Patent [19]
Köhler et al.

[11] Patent Number: 5,158,985
[45] Date of Patent: Oct. 27, 1992

[54] POLYCARBONATE FOAM ARTICLES

[75] Inventors: Burkhard Köhler; Klaus Horn; Wolfgang Ebert, all of Krefeld; Klaus Kircher, Leverkusen; Johann Piontek, Dormagen, all of Fed. Rep. of Germany

[73] Assignee: Bayer Aktiengesellschaft, Leverkusen, Fed. Rep. of Germany

[21] Appl. No.: 815,085

[22] Filed: Dec. 27, 1991

[30] Foreign Application Priority Data

Jan. 5, 1991 [DE] Fed. Rep. of Germany ....... 4100200
Jan. 10, 1991 [DE] Fed. Rep. of Germany ....... 4100517
Jan. 11, 1991 [DE] Fed. Rep. of Germany ....... 4100592

[51] Int. Cl.$^5$ .............................. C08J 9/08; C08J 9/12
[52] U.S. Cl. ..................................... 521/79; 264/46.1; 264/53; 264/54; 521/97; 521/99; 521/180
[58] Field of Search ...................... 521/180, 99, 79, 97; 264/46.1, 53, 54

[56] References Cited

U.S. PATENT DOCUMENTS

| | | | |
|---|---|---|---|
| 3,222,302 | 12/1965 | Bollert et al. | 521/77 |
| 3,277,029 | 10/1966 | Chadwick et al. | 260/2.5 |
| 3,290,261 | 12/1966 | Goldblum | 521/180 |
| 3,567,813 | 3/1971 | Keane et al. | 264/102 |
| 3,951,903 | 4/1976 | Shaffer | 260/37 PC |
| 4,263,409 | 4/1981 | Liberti | 521/180 |
| 4,338,422 | 7/1982 | Jackson, Jr. et al. | 525/461 |
| 4,408,000 | 10/1983 | Lee | 524/315 |
| 4,409,351 | 10/1983 | Lee | 524/322 |
| 4,472,554 | 9/1984 | Grigo et al. | 525/67 |
| 4,567,210 | 1/1986 | Hammer et al. | 521/180 |
| 4,581,382 | 4/1986 | Liberti et al. | 521/180 |
| 4,587,272 | 5/1986 | Avakiara | 521/180 |
| 4,751,250 | 6/1988 | White et al. | 521/180 |
| 4,845,193 | 7/1989 | Umemura et al. | 528/502 |
| 4,904,702 | 2/1990 | Allen | 521/180 |
| 4,927,903 | 5/1990 | Schreckenberg et al. | 528/176 |
| 4,940,733 | 7/1990 | Kuphal et al. | 521/180 |
| 4,965,303 | 10/1990 | Kishimoto | 524/107 |

FOREIGN PATENT DOCUMENTS

| | | |
|---|---|---|
| 1031507 | 6/1958 | Fed. Rep. of Germany . |
| 1260479 | 2/1968 | Fed. Rep. of Germany . |
| 3704666 | 4/1988 | Fed. Rep. of Germany . |
| 47-41092 | 10/1972 | Japan . |
| 841652 | 7/1960 | United Kingdom . |
| 1479292 | 6/1974 | United Kingdom . |

*Primary Examiner*—Morton Foelak
*Attorney, Agent, or Firm*—Joseph C. Gil; Aron Preis

[57] ABSTRACT

A process for the production of polycarbonate foam moldings is disclosed. Accordingly, a composition is prepared comprising mixing a thermoplastic polycarbonate resin and 0.01 to 1 mole-% of a transesterification catalyst and a) 0.1 to 5 mole-% of an aromatic polycarboxylic acid, optionally along with about 0.1 to 5 mole-% of at least one member selected from the group consisting of aliphatic hydroxy carboxylic acids and aliphatic polyalcohols, or b) 0.1 to 5 mole-% of $H_2O$, optionally along with at about 0.1 to 5 mole-% of at least one member selected from the group consisting of aliphatic hydroxycarboxylic acids and an aliphatic alcohols, or c) the additives of said a) and b), or d) 0.1 to 5 mole-% of at least one member selected from the group consisting of diarylcarbonates and oligocarbonates, said percent based in every case on moles aromatic carbonate structural units

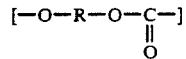

in which —O—R—O— is a diphenolate residue. The composition obtained is processed to foam moldings by injection molding or by extrusion at temperatures of 210° C. to 340° C.

15 Claims, No Drawings

POLYCARBONATE FOAM ARTICLES

FIELD OF THE INVENTION

The invention concerns polycarbonates and more particularly, a process for the preparation of foamed articles made of polycarbonate resin and a foaming agent.

SUMMARY OF THE INVENTION

A process for the production of polycarbonate foam moldings is disclosed. Accordingly, a composition is prepared comprising mixing a thermoplastic polycarbonate resin and 0.01 to 1 mole-% of a transesterification catalyst and a) 0.1 to 5 mole-% of an aromatic polycarboxylic acid, optionally along with about 0.1 to 5 mole-% of at least one member selected from the group consisting of aliphatic hydroxy carboxylic acids and aliphatic polyalcohols, or b) 0.1 to 5 mole-% of $H_2O$, optionally along with at about 0.1 to 5 mole-% of at least one member selected from the group consisting of aliphatic hydroxycarboxylic acids and an aliphatic alcohols, or c) the additives of said a) and b), or d) 0.1 to 5 mole-% of an aromatic polycarboxylic acid and 0.1 to 5 mole-% of at least one member selected from the group consisting of diarylcarbonates and oligocarbonates, said percent based in every case on moles aromatic carbonate structural units

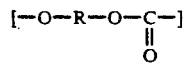

in which —O—R—O— is a diphenolate residue. The composition obtained is processed to foam moldings by injection molding or by extrusion at temperatures of 210° C. to 340° C.

BACKGROUND OF THE INVENTION

The foaming of polycarbonates is known, preferred blowing agents being those which give off an inert gas, such as nitrogen or carbon dioxide (see, for example, DE-AS 1,031,507 and DE-OS 2,434,085).

It is also known that oxalic acid can be used as the blowing agent (see U.S. Pat. No. 3,277,029).

Surprisingly, polycarbonates themselves can be used to foam polycarbonates providing $CO_2$ is released through controlled, partial degradation of the polycarbonate and used to foam the remaining polycarbonate.

Controlled degradation of the polycarbonate is obtained by the addition of transesterification catalysts in combination with aromatic polycarboxylic acids and/or $H_2O$. Where $H_2O$ is used without aromatic polycarboxylic acids, aliphatic hydroxycarboxylic acids and/or aliphatic alcohols may be combined with the addition of the $H_2O$.

It is known that polycarbonates can be degraded with release of carbon dioxide under the influence of acids (see DE-AS 1,260,479), even in combination with catalysts (see EP 0,127,842 and U.S. Pat. No. 4,338,422).

However, it is also known that polycarbonates can be stabilized against the effect of moisture and against irradiation by the addition of acids (see U.S. Pat. No. 3,951,903 and EP 0,353,776).

It is also known that satisfactory processing of polycarbonates is only possible in the dry state (see Bayer-Kunststoffe, 2nd Edition, 1959, page 177) and that moisture leads to molecular weight degradation (Plastics Technology, 10, 1964, pages 32–36) or to the formation of blisters (GB-PS 841,652).

It is also known, however, that the addition of $H_2O$ to polycarbonate followed by vacuum extrusion results in clear polycarbonate material (see U.S. Pat. No. 3,567,813 and EP-0,300,485).

Mixtures of polycarbonates, a particular graft polymer and a polymeric acidifying agent are disclosed in DE-OS 3,325,702. The molding compounds obtainable from the mixtures have improved stability and impact strength.

The addition of fatty acids as mold release agents for polycarbonates is also known (see U.S. Pat. No. 4,409,351 and U.S. Pat. No. 4,408,000). In this case, however, degradation of the polycarbonate also occurs (see DE-OS 3,704,666. Comparison Example 2, and Jp-Sho 47-41092).

EP-A-0,158,212 describes the use of monoesters and diesters of citric acid for the production of foamed plastics. Polycarbonates are among the plastics mentioned.

DETAILED DESCRIPTION OF THE INVENTION

In accordance with the invention (embodiment a) there is prepared a molding composition comprising a polycarbonate resin, and 0.01 to 1 mole-% of a transesterification catalyst and 0.1 to 5 mole-% of an aromatic polycarboxylic acid, optionally along with about 0.1 to 5 mole-% of at least one member selected from the group consisting of aliphatic hydroxy carboxylic acids and aliphatic polyalcohols.

In a yet additional embodiment of the invention (embodiment b) a composition is prepared by mixing a polycarbonate resin, and 0.01 to 1 mole-% of a transesterification catalyst and 0.1 to 5 mole-% of $H_2O$, optionally along with at about 0.1 to 5 mole-% of at least one member selected from the group consisting of aliphatic hydroxycarboxylic acids and an aliphatic alcohols.

In a yet additional embodiment (embodiment c) a composition is prepared by mixing a polycarbonate resin, and 0.01 to 1 mole-% of a transesterification catalyst and 0.1 to 5 mole-% of the additives of said embodiments a) and b).

In an additional embodiment (embodiment d) a composition is prepared by mixing a polycarbonate resin, and 0.01 to 1 mole-% of a transesterification catalyst and 0.1 to 5 mole-% of an aromatic polycarboxylic acid and 0.1 to 5 mole-% of at least one member selected from the group consisting of diarylcarbonates and oligocarbonates.

In an additional embodiment thermoplastic polycarbonate is mixed with a transesterification catalyst in quantities of from 0.01 mole-% to 1 mole-% and with aromatic polycarboxylic acids in quantities of from 0.1 mole-% to 5 mole-% and with aliphatic hydroxycarboxylic acids and/or aliphatic polyalcohols in quantities of from 0.1 mole-% to 5 mole-%.

In all instances, said percent based in every case on moles aromatic carbonate structural units

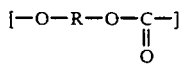

in which —O—R—O— is a diphenolate residue. The composition obtained is processed to foam moldings by injection molding or by extrusion at temperatures of 210° C. to 340° C.

The mixing is carried out in suitable mixers at temperatures from 220° C. to 320° C. and the mixture obtained is worked up into molded foam articles by injection molding or extrusion at temperatures from 220° C. to 320° C. for reaction times of from 0.5 minutes to 5 minutes, preferably from 1 minute to 2 minutes. Molded polycarbonate foam articles are obtained in accordance with the process of the invention.

In accordance with embodiment d of the present invention, thermoplastic aromatic polycarbonates are mixed with transesterification catalysts in quantities of from 0.01 mole-% to 1 mole-% in combination with aromatic polycarboxylic acids in quantities of from 0.1 mole-% to 5 mole-% and with diarylcarbonates and/or oligocarbonates in quantities of from 0.1 mole-% to 5 mole-% at temperatures from 220° C. to 320 C and the mixture is either extruded at from 220° C. to 320° C. in an extruder without application of a vacuum to form foamed molded articles or injection molded at temperatures from 190° C. to 330° C. in injection molding machines to form foamed molded articles.

Thermoplastic aromatic polycarbonates in the context of the present invention are polycarbonates which have been produced from diphenols and carbonate donors by any of the standard methods known from the literature (see, for example, H. Schnell, Chemistry and Physics of Polycarbonates, Interscience Publishers, New York, 1964; U.S. Pat. No. 3,028,365 and DE-OS 3,832,396).

Diphenols for polycarbonates such as these may be, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes and also nucleus-alkylated and nucleus halogenated compounds thereof.

Preferred diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis(3,5-dimethyl-4-hydroxyphenyl)-methane, 2,2-bis-(3,5-dimethyl-4-hydroxyphenyl)propane, bis-(3,S-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxy-phenyl) -propane and 1,1-bis(4hydroxyphenyl)-3,3,5-trimethyl cyclohexane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane, 1,1-bis-(4-hydroxyphenyl)cyclohexane and 1,1-bis-(4-hydroxyphenyl)-3,3,5-trimethyl cyclohexane.

The diphenols may be used individually or in admixture with one another, i.e. both homopolycarbonates and copolycarbonates are included. The diphenols are known from the literature or may be produced by methods known from the literature.

Small quantities, preferably quantities of 0.05 to 2.0 mole-%, based on moles diphenols used, of trifunctional or more than trifunctional compounds, particularly those containing three or more than three phenolic hydroxyl groups, may also be used. Examples of suitable compounds containing three or more than three phenolic hydroxyl groups are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxy-phenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy5'-methylbenzyl)-4-methylphenol, 2-(4-hydroxyphenyl)-2-(3,4-dihydroxyphenyl)-propane, hexa(4-(4-hydroxyphenylisopropyl)-phenyl)-orthoterephthalic acid ester, tetra-(4-(4-hydroxyphenylisopropyl)-phenoxy)-methane and 1,4-bis-(4',4''-dihydroxytriphenyl)-methylbenzene.

Other possible branching agents are 2,4-dihydroxybenzoic acid, trimesic acid, cyanuric chloride and 3,3-bis-(3-methyl-4-hydroxyphenyl)-2-oxo-2,3-dihydroindole.

The 0.05 to 2 mole-%, based on diphenols used, of branching agents optionally used may either be introduced with the diphenols themselves and the molecular weight regulators in the aqueous alkaline phase or may be added in solution in an organic solvent before the phosgenation reaction.

Suitable molecular weight regulators are the known monofunctional compounds, preferably monophenols.

The aromatic polycarbonates according to the invention should have average molecular weights Mw (weight average, as determined by gel permeation chromatography) in the range from 5,000 to 50,000 and preferably in the range from 15,000 to 35,000.

Accordingly, the solution viscosities are in the range from 1.15 to 1.35, as measured in dichloromethane (0.5 g/100 ml).

Thermoplastic aromatic polycarbonates in the context of the present invention include thermoplastic aromatic polyester carbonates, i.e. "polycarbonates" in which part (at most 50 mole-%) of the carbonate structural units are replaced in known manner by aromatic dicarboxylate structural units.

Suitable aromatic dicarboxylic acids are, for example, orthophthalic acid, terephthalic acid, isophthalic acid, tert. butyl isophthalic acid, 3,3'-diphenyl dicarboxylic acid, 4,4'-diphenyl dicarboxylic acid, 4,4'-diphenyl ether dicarboxylic acid, 4,4'-benzophenone dicarboxylic acid, 3,4'-benzophenone dicarboxylic acid, 4,4'-diphenyl sulfone dicarboxylic acid, 2,2-bis-(4-carboxyphenyl)-propane, trimethyl-3-phenylindane-4,5'-dicarboxylic acid.

Among the aromatic dicarboxylic acids, terephthalic acid and/or isophthalic acid are particularly preferred.

Suitable diphenols are those mentioned above for the o production of the polycarbonates.

The same applies to the branching agents and to the monophenolic chain terminators, although aromatic monocarboxylic acids, for example in the form of their acid chlorides or esters, may also be used for this purpose.

The carbonic acid may be incorporated in the polyester carbonates either via COCl$_2$ or via diphenyl carbonate, depending on the production process selected, i.e. depending on whether interfacial polycondensation or melt transesterification is used for the production of the polyester carbonates.

The same applies to the aromatic dicarboxylic acids. They are used either as aromatic dicarboxylic acid dichlorides in the interfacial process or as dicarboxylic acid diesters in the melt transesterification process. The same applies where monocarboxylic acids are used as chain terminators.

The polyester carbonates to be used in accordance with the invention are produced by known methods, i.e. for example by the interfacial method or by the melt transesterification method, as already mentioned.

Accordingly, the polyester carbonates to be used may be both linear and branched in known manner.

The aromatic polyester carbonates have average molecular weights Mw (weight average, as determined by gel permeation chromatography) in the range from 5,000 to 50,000 and preferably in the range from 15,000 to 35,000.

The molar ratio of carbonate units to aromatic dicarboxylate units in the polyester carbonates to be used in accordance with the invention is at least 50:50, preferably 75:25 and, more preferably, 90:10. In other words, in the polyester carbonates to be used in accordance with the invention, the excess weight is with the carbonate structural units as the CO$_2$ source.

Transesterification catalysts used according to the invention are those compounds already known in principle for the transesterification of carbonic acid esters or carboxylic acid esters, such as metal oxides, metal hydroxides, metal alkoxides, carboxylic acid compounds of metals or organometallic compounds as well as 5-membered heterocyclic compounds containing nitrogen, amidines, tertiary amines and their salts, tetraalkylammonium hydroxides and tetraalkyl- ammonium- or alkali metal tetraphenylboranates.

Suitable metals are those of the first main and secondary group, the second main and secondary group, the third main group, the fourth main and secondary group, the fifth main group, the sixth secondary group and the seventh and eighth secondary groups.

Preferred transesterification catalysts are dibutyl tin oxide, dibutyl tin dilaurate, SnO$_2$, MgO, CaO, Ca(OH)$_2$, tetrabutoxy orthotitanate, zinc acetate, diazabicycloundecene, diazabicyclononene, DABCO, imidazole, tetramethyl ammonium hydroxide, sodium hydroxide, potassium hydroxide, benzimidazole, ammonia, piperazine, lead acetate, PbO, Sb$_2$O$_3$, iron acetyl acetonate, cobalt acetate and triethyl ammonium chloride.

The transesterification catalysts are used in quantities of 0.01 mole-% to 1 mole-%, based on molar aromatic carbonate structural unit

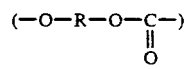

of the polycarbonate to Preferred molar quantities of transesterification catalysts are 0.04 to 0.1 mole-%.

The moiety —O—R—O— is the residue of a diphenolate.

Suitable aromatic polycarboxylic acids are, in particular, aromatic tricarboxylic acids, above all those of which the carboxyl groups are not capable of forming a 5-ring or 6-ring dianhydride.

Suitable polycarboxylic acids are, for example, trimesic acid, isophthalic acid, terephthalic acid, 4,4'- or 3,3'-diphenyl ether dicarboxylic acid, 2,6-naphthalene dicarboxylic acid, trimellitic acid, 1,4,5,8-naphthalene tetracarboxylic acid, 3,3', 4,4'-benzophenone tetracarboxylic acid, 2,2', 4,4'-diphenyl sulfone tetracarboxylic acid, phthalic acid and 2,2', 4,4'-diphenyl ether tetracarboxylic acid, and also aromatic hydroxypolycarboxylic acids, such as 3- or 4-hydroxyphthalic acid, hydroxyterephthalic acid and 2,5-dihydroxyterephthalic acid. The preferred polycarboxylic acid is trimesic acid.

The aromatic polycarboxylic acids are used in quantities of 0.1 mole-% to 5 mole-% and preferably in quantities of 0.5 mole-% to 2 mole-%, again based on molar aromatic carbonate structural unit

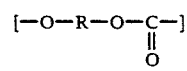

of the polycarbonate to be foamed.

Suitable hydroxycarboxylic acids are citric acid and its mono- or dialkyl esters, glyoxylic acid, lactic acid, ε-hydroxycaproic acid, γ-hydroxybutyric acid, malic acid or tartaric acid.

They are used in quantities of 0.1 mole-% to 2 mole-% and preferably in quantities of 0.2 mole-% to 1 mole-%, again based on molar aromatic carbonate structural unit

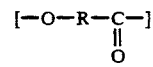

of the polycarbonate to be foamed.

The following are suitable aliphatic hydroxycarboxylic acids: Glyoxylic acid, lactic acid, ε-hydroxycaproic acid, γ-hydroxybutyric acid, malic acid and tartaric acid.

They are used in quantities of from 0.1 mole-% to 5 mole-%, preferably from 0.2 mole-% to 2 mole-%, again based on the molar quantity of aromatic carbonate structural units

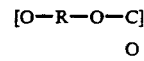

of the polycarbonate to be foamed.

Aliphatic di-, tri- and tetra-alcohols and aliphatic alcohols having more than four alcoholic OH groups are suitable aliphatic polyalcohols.

The following are examples of suitable aliphatic alcohols: Ethylene glycol, butanediol, propylene glycol, adipol, glycerol, trimethylolpropane, neopentyl glycol, pentaerythritol, mannitol and sorbitol and polymeric alcohols such as polyethylene glycol, polytetrahydrofuran and polypropylene glycol preferably having a molecular weight Mn below 5000, Mn being determined in known manner by determination of the OH end groups.

Pentaerythritol is a preferred polyhydric alcohol.

The water is used in a quantity of 0.1 mole-% to 5 mole and preferably in a quantity of 0.2 mole-% to 2 mole-%, based on moles aromatic carbonate structural units

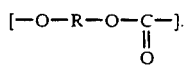

Suitable diaryl and/or oligocarbonates correspond to formula (1)

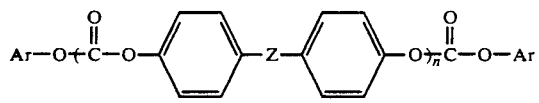

wherein
Ar stands for any $C_6$–$C_{14}$-aryl group, preferably a phenyl group,
Z stands for a $C_1$–$C_{22}$-alkylene or alkylidene group, preferably a 2,2-isopropylidene group, and
n stands for a natural number from 0 to 20, preferably 0.

Diphenylcarbonate is particularly preferred.

The transesterification catalysts are incorporated in combination with the aromatic polycarboxylic acids and/or with $H_2O$, optionally using aliphatic hydroxycarboxylic acids and/or aliphatic alcohols, in suitable mixers at temperatures in the range from 220° C. to 320° C. and preferably at temperatures of 240° C.

The particular mixture may then be processed to foam moldings by injection molding, for example at 260° C. to 340° C., or by extrusion, for example at 210° C. to 270° C., the reaction times ranging from 0.5 minute to 5 minutes.

The polycarbonate foam moldings obtained in accordance with the invention are distinguished by their light color, their uniform fine foam structure and their smooth surface.

Accordingly, the present invention also relates to a process for the production of polycarbonate foam moldings, characterized in that thermoplastic polycarbonates having average weight average molecular weights Mw of 5,000 to 50,000 and preferably 15,000 to 35,000 are mixed in suitable mixers with transesterification catalysts in quantities of 0.01 mole-% to 1 mole-% in combination with aromatic polycarboxylic acids in quantities of 0.1 mole-% to 5 mole-% and/or in combination with $H_2O$ in quantities of 0.1 mole-% to 5 mole-%, optionally using aliphatic hydroxycarboxylic acids and/or aliphatic alcohols in quantities of 0.1 mole-% to 5 mole-%, based in every case on moles aromatic carbonate structural units

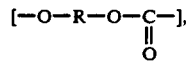

in which —O—R—O is a diphenolate residue and the mixture obtained is processed to foam moldings by injection molding or extrusion at temperatures of 210° C. to 340° C. over reaction times of 0.5 minutes to 5 minutes and preferably 1 minute to 2 minutes.

The present invention also relates to the polycarbonate foam moldings obtainable in accordance with the invention.

The foaming process according to the invention may also be carried out in the presence of additives of the type typically used in the production of foams, such as reinforcing materials, for example glass fibers, and/or nucleating agents and/or flameproofing agents, for example nonafluorobutane sulfonic acid salts, and/or mold release agents, for example pentaerythritol tetrastearate, and/or dyes and/or pigments, for example rutile or carbon black, and/or heat and UV stabilizers.

Accordingly, the present invention also relates to the extension of the process according to the invention to include one or more of these additives.

The present invention also relates to the additive-containing polycarbonate foam moldings obtainable by the process according to the invention.

The polycarbonate foam moldings obtainable in accordance with the invention may be used as moldings for the production of large-area shrouds for lamps, housings, office equipment or for the production of large-area cabinet elements.

The polycarbonate foams obtainable by the process according to this embodiment of the invention are intrinsically very light in color and tough and have an excellent cell structure. The degree of foaming may be controlled over wide ranges by the nature and quantity of the conventional additives used in the preparation of the foams.

The present invention thus also relates to the molded polycarbonate foam products obtainable by the process according to the invention.

The foaming process according to this embodiment of the invention may be carried out with the addition of conventional used for the production of foams, such as reinforcing materials, e.g. glass fibers, and/or nucleating agents and/or flame-retardants and/or mold release agents and/or dyes and/or pigments, for example, rutile or carbon black, and/or stabilizers against heat, UV radiation or moisture.

The present embodiment of the invention thus also relates to the foaming of thermoplastic aromatic polycarbonates containing conventional additives, characterized in that thermoplastic, aromatic polycarbonates are mixed with transesterification catalysts in combination with aromatic polycarboxylic acids and diarylcarbonates and/or oligocarbonates at temperatures from 220° C. to 320° C. after addition of the usual additives, and the mixtures are then either extruded in an extruder at temperatures from 220° C. to 320° C. without application of a vacuum to produce foamed molded articles or injection molded in injection molding machines at temperatures from 190° C. to 320° C. to produce foamed molded articles.

The present embodiment of the invention also relates to the additive-containing molded polycarbonate foam products obtainable by this process according to the invention.

The process according to the invention may be extended in that other thermoplasts may be added to the polycarbonates to be foamed, preferably thermoplastic polyalkylene terephthalates, ABS polymers, SAN polymers and polyolefins in quantities of up to 100% by weight, based in each case on the weight of the polycarbonate.

The foaming process is not impaired by the presence of these other thermoplasts.

The present invention thus also relates to the foaming of thermoplastic aromatic polycarbonates mixed with at most equal quantities by weight of other thermoplasts, characterized in that the thermoplastic aromatic polycarbonates mixed with at most equal quantities by weight of other thermoplasts are foamed in accordance with this application.

The conventional additives already mentioned above may also be included.

The present invention also relates to those polycarbonate foams obtainable by the process according to the invention which contain other thermoplasts and optionally conventional additives.

Known impact strength modifiers such as, for example, hydrogenated butadiene-styrene copolymers or acrylate graft rubbers may be added in the usual quantities to the polycarbonates to be foamed according to the invention, preferably quantities of up to 10% by weight, based on the weight of the polycarbonate.

The present invention therefore also relates to the foaming of thermoplastic, aromatic polycarbonates in all its variations mentioned so far, characterized in that impact strength modifiers are added to the polycarbonates in quantities of up to 10% by weight, based on the weight of the polycarbonate, before the foaming according to the invention is carried out.

The present embodiment also relates to the molded polycarbonate foam products obtainable by this process.

Examples of thermoplastic polyalkylene terephthalates which may be added according to the invention include those based on ethylene glycol, propane-1,3-diol, butane-1,4-diol, hexane-1,6-diol and 1,4-bis-hydroxymethyl-cyclohexane. The molecular weights (Mw) of these polyalkylene glycol terephthalates are from 10,000 to 80,000. The polyalkylene glycol terephthalates may also be obtained by known processes, for example by transesterification of terephthalic acid dialkylesters and the corresponding diol. A lower alkyl ester of terephthalic acid, for example, may be used as starting material, preferably the dimethyl ester, and this may be esterified with an excess of diol in the presence of suitable catalysts to form the bis-hydroxyalkylester of terephthalic acid.

In this process, the initial temperature of 140° C. is raised to 210°–220° C. The alcohol liberated is distilled off. Condensation is then completed at temperatures from 210°–280° C. and at the same time the pressure is lowered stepwise to below 1 Torr while the excess diol is distilled off.

Thermoplastic ABS polymers which may be used according to the invention include those, in which either a monomer selected from styrene and methyl methacrylate or a monomer mixture of from 95 to 50% by weight of styrene, α-methylstyrene, methyl methacrylate or mixtures thereof and from 5–50% by weight of acrylonitrile, methyl methacrylate, maleic acid anhydride. N-substituted maleimides or mixtures thereof is graft polymerized on a rubber. Suitable rubbers include in particular polybutadiene, butadiene/styrene copolymers having up to 30% by weight of styrene incorporated by polymerization, copolymers of butadiene and acrylonitrile containing up to 20% by weight of acrylonitrile or copolymers of butadiene containing up to 20% by weight of a lower alkyl ether of acrylic or methacrylic acid (e.g. methyl acrylate, ethyl acrylate, methylmethacrylate or ethyl methacrylate).

The graft copolymers contain from 5–80% by weight, in particular from 20–70% by weight, of rubber and from 95–20% by weight, in particular from 80–30% by weight, of graft copolymerized monomers. The rubbers are present in these graft copolymers in the form of at least partially cross-linked particles having an average particle size of from 0.09 to 5 μm, in particular from 0.1 to 1 μm. Such graft copolymers are prepared by radical graft copolymerization of monomers selected from styrene, α-methylstyrene, acrylonitrile, methyl methacrylate and maleic acid anhydride in the presence of the rubbers to be grafted, and they are all known products. Preferred methods of preparation of such graft copolymers are emulsion polymerization, solution polymerization, solvent-free polymerization and suspension/polymerization.

Thermoplastic SAN polymers which may be used according to the invention are copolymers of from 95–50 parts by weight of styrene, α-methylstyrene, methyl methacrylate or mixtures thereof and from 5–50 parts by weight of acrylonitrile, methacrylonitrile, methyl methacrylate or mixtures thereof. Among these copolymers, products of about 80–60% by weight of styrene, and 20–40% by weight of acrylonitrile and the analogous copolymers of -methylstyrene are particularly preferred.

The thermoplastic polyolefins which may be used according to the invention include polymers of aliphatically unsaturated hydrocarbons such as, for example, ethylene, propylene, butylene or isobutylene obtained by conventional methods such as radical polymerization and having average weight average molecular weights Mw (determined by gel chromatographic methods' of from 1000 to 3,000,000. Both high pressure polyolefins and low pressure polyolefins may be used. The unsaturated hydrocarbons may also be copolymerized with other vinyl monomers, e.g. vinyl acetate, in known manner.

The polyolefins may also be modified by controlled oxidative degradation (polyethylene waxes).

The initial mixing of the individual components, i.e. the polycarbonates, transesterification catalysts, polyacids and di- or oligoaryl carbonates, conventional additives, other thermoplasts and/or impact strength modifiers may be carried out at room temperature in known manner.

The foaming according to the invention is then carried out in conventional machines. The foams obtainable according to the invention may be shaped into any molded articles or cut to the required size and shape after foaming.

The foam articles obtainable according to the invention may advantageously be used as molded parts for the production of large surfaced coverings of lamps, housings or office equipment or for the production of large surfaced elements for the construction of cupboards.

The invention is further illustrated but is not intended to be limited by the following examples in which all parts and percentages are by weight unless otherwise specified.

EXAMPLES (Addition of transesterification catalyst and aromatic polycarboxylic acid)

Example 1

A mixture prepared from 87.45% branched bisphenol A polycarbonate, 10% of a mixture of polycarbonate with 30% chopped strands (E glass) 2% of a pigment mixture 07/394 of $TiO_2$ and carbon black, 0.5-trimesic acid and 0.05% dibutyl tin oxide is extruded in a three-zone single-screw extruder at 240°/250°/190° C. Extrusion is carried out in a three-zone single-screw extruder with a constant pitch of 1 D, a screw diameter D of 37 mm, a screw length L of 25 D and a flight depth ratio (metering zone/feed zone) of 1:2.5. The temperatures of the zones are 240° C., 250° C. and 190° C. Foaming is carried out without calibration by the free foaming method. A closed-cell, fine-cell foam having a density of 0.8 g/cm$^3$ is obtained.

Example 2

A mixture prepared from 87.45% branched bisphenol A polycarbonate, 10% of a mixture of polycarbonate with 30% chopped strands, 2% of a pigment mixture of $TiO_2$ and carbon black, 0.5% trimesic acid and 0.05% magnesium stearate is extruded in a three-zone single-screw extruder at 240°/250°/190° C. The procedure is as described in Example 1 and a foam having a density of 0.4 g/cm$^3$ is obtained.

Example 3

A mixture prepared from 87.45% branched bisphenol A polycarbonate, 10% of a mixture of polycarbonate with 30% chopped strands (E glass) 2% of a pigment mixture of $TiO_2$ and carbon black, 0.5% trimesic acid and 0.05% trimesic acid diammonium salt is extruded in a three-zone single-screw extruder at 240°/250°/190° C. The procedure is as described in Example 1 and a foam having a density of 0.5 g/cm$^3$ is obtained.

Example 4

A mixture prepared from 87.45% branched bisphenol A polycarbonate, 10% of a mixture of polycarbonate with 30% chopped strands (E glass), 2% of a pigment mixture 07/394 of $TiO_2$ and carbon black, 0.5% trimesic acid and 0.05% piperazine is extruded in a three-zone single-screw extruder at 240°/250°/190° C. The procedure is as described in Example 1 and a foam having a density of 0.5 g/cm$^3$ is obtained.

Examples B (Addition of transesterification catalyst and $H_2O$)

Example 5

A mixture of 89.5% bisphenol A polycarbonate, 10% of a polycarbonate containing 30% chopped strands (E glass), 0.49% water and 0.01% calcium oxide is extruded.

Extrusion is carried out in a three-zone single-screw extruder having a constant pitch of 1 D, a screw diameter D of 37 mm, a screw length L of 25 D and a flight depth ratio (metering zone/feed zone) of 1:2.5. The temperatures of the zones are 240° C., 250° C. and 190° C. Foaming is carried out without calibration by the free foaming method. A closed-cell foam having a density of 0.6 g/cm$^3$ is obtained.

Example C (Addition of transesterification catalyst, aromatic polycarboxylic acid and $H_2O$)

Example 6

A mixture of 87.35% branched bisphenol A polycarbonate, 10% of a mixture of polycarbonate containing 30% chopped strands (E glass) 2% of a pigment mixture of carbon black and $TiO_2$, 0.05% dibutyl tin oxide, 0.5% trimesic acid and 0.1% water. The procedure is as described in Example 1 and a foam having a density of 0.5 g/cm$^3$ is obtained.

Example D (Addition of transesterification catalyst, $H_2O$ and aliphatic hydroxycarboxylic acids)

Example 7

A mixture of 87.5% branched bisphenol A polycarbonate, 10% of a mixture of polycarbonate containing 30% chopped strands (E glass), 2% of a pigment mixture 07/394 of $TiO_2$ and carbon black, 0.5% trimesic acid, 0.4% water, 0.01, calcium oxide and 0.09% citric acid butyl ester (Boeringer-Ingelheim) is extruded in the same way as in Example 5. A foam having a density of 0.5 g/cm$^3$ is obtained.

Example E (Addition of transesterification catalyst, $H_2O$ and aliphatic alcohol)

A mixture of 87% branched bisphenol A polycarbonate, 10% of a mixture of Makrolon containing 30% chopped strands (E glass) 2% of a pigment mixture of $TiO_2$ and carbon black, 0.5% pentaerythritol, 0.4% water and 0.1% dibutyl tin oxide is extruded in the same way as described in Example 1. A foam having a density of 0.5 g/cm$^3$ is obtained.

In the following examples 8-11, the polycarbonates used were not dried.

Example 8

A mixture of 87.20 % of branched polycarbonate having a relative solution viscosity of 1.3, 10% of a mixture of polycarbonate containing 30% of short glass fibers (E-glass) 2% of pigment 07/394 (mixture of $TiO_2$ and carbon black), 0.5% of trimesic acid, 0.25% of diphenylcarbonate and 0.05% of dibutyl tin oxide is extruded. Extrusion is carried out in a three-zone single-screw extruder having a constant screw pitch of I D, screw diameter D=37 mm, length of screw L=25 D, screw pitch ratio (ejection zone/intake zone) 1:2.5. The temperatures of the zones were 240° C., 250° C. and 190 C. Foaming was carried out by the process of free rise foaming without calibration. A finely porous, closed cell foam having a density of 0.5 g/cm$^3$ was obtained. The relative solution viscosity was 1.29.

Example 9

A mixture of 86.95% of branched polycarbonate having a relative solution viscosity of 1.31, 10% of a mixture of polycarbonate containing 30% of short glass fibers, 2% of pigment 07/394, 0.5% of trimesic acid, 0.5% of diphenyl carbonate and 0.05% of dibutyl tin oxide is extruded. The procedure described in Example 8 is carried out and a finely porous, closed cell foam having a density of 0.5 g/cm$^3$ is obtained. The relative solution viscosity was 1.30.

Example 10

A mixture of 98.9% of polycarbonate having a relative solution viscosity of 1.28, 1% of trimesic acid, 1% of diphenylcarbonate and 0.1% of: sodium tetraphenylcarbonate is extruded. The procedure described in Example 8 is carried out. A finely porous, closed cell foam having a density of 0.5 g/cm$^3$ is obtained. The relative solution viscosity was 1.28.

Example 11

A mixture of 87.45% of bisphenol-A polycarbonate, 10% of bromine-containing polycarbonate, containing 30% of short glass fibers, E-glass, 2% of pigment 07/394 (mixture of $TiO_2$ and carbon black), 0.4% of trimesic acid, 0.1% of pentaerythritol and 0.05% of dibutyl tin oxide is extruded. Extrusion is carried out in a three-zone single screw extruder with constant screw pitch of 1 D, screw diameter D=37 mm, screw length L=25 D and pitch ratio (ejection zone/intake zone) 1:2.5. The temperatures of the zones were 240° C, 250° C. and 190° C. Foaming was carried out by the process of unrestricted foaming without calibration. A finely porous, closed cell foam having a density of 0.5 g/cm$^3$ was obtained.

Example 12

A mixture of 87.45% of bisphenol-A polycarbonate, bromine containing polycarbonate containing 30% of short glass fibers, 2% of pigment 97/394, 0.4% of isophthalic acid, 0.1% of pentaerythritol and 0.05% of dibutyl tin oxide is extruded. The procedure described in Example 11 is carried out and a finely porous, closed cell foam having a density of 0.5 g/cm$^3$ is obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of foamed articles comprising using a thermoplastic molding composition containing a polycarbonate resin having a weight average molecular weight of 5,000 to 50,000, about 0.01 to 1 mole-% of a transesterification catalyst and a foaming agent selected from the group consisting of
   a) about 0.1 to 5 mole-% of an aromatic polycarboxylic acid,
   b) about 0.1 to 5 mole-% $H_2O$,
   c) said a) and said b),
   d) about 0.1 to 5 mole-% of an aromatic polycarboxylic acid and about 0.1 to 5 mole-% of at least one member selected from the group consisting of diarylcarbonates and oligocarbonates wherein said mole-% is based on the molar amount of the aromatic carbonate structural units

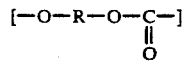

in which —O—R—O— is a diphenolate residue and processing said composition by injection molding or extrusion at temperatures of 210° C. to 340° C. to prepare foamed molded articles.

2. The process of claim 1 wherein said a) further contains about 0.1 to 5 mole-% of at least one member selected from the group consisting of aliphatic hydroxy carboxylic acids and aliphatic polyalcohols.

3. The process of claim 1 wherein said b) further contains about 0.1 to 5 mole-% of at least one member selected from the group consisting of aliphatic hydroxycarboxylic acids and aliphatic alcohols.

4. The process of claim 1 wherein said composition further contains at least one member selected from the group consisting of reinforcing materials, nucleating agents, flame-retardants, mold release agents, dyes, pigments, heat stabilizers, UV stabilizers and hydrolysis stabilizers.

5. A process for the production of polycarbonate foam moldings, comprising using a thermoplastic molding composition which includes a polycarbonate resin having a weight average molecular weight of 5,000 to 50,000 and about 0.01 to 1 mole-% of a transesterification catalyst and about 0.1 to 5 mole-% of at least one member selected from the group consisting of an aromatic polycarboxylic acid and $H_2O$, wherein said percent is relative to the molar amount of aromatic carbonate structural units

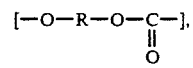

in which —O—R—O— is a diphenolate residue and processing said composition to foam moldings by injection molding or extrusion at temperatures of 210° C. to 340° C. over reaction times of 0.5 to 5 minutes.

6. The process of claim 5 wherein said composition further contains about 0.1 to 5 mole-% of at least one member selected from the group consisting of aliphatic hydroxycarboxylic acids and aliphatic alcohols.

7. The process of claim 5 wherein said composition further contains at least one member selected from the group consisting of reinforcing materials, nucleating agents, flame-retardants, mold release agents, dyes, pigments, heat stabilizers, UV stabilizers and hydrolysis stabilizers.

8. A process for the production of polycarbonate foam moldings, comprising using a thermoplastic molding composition which includes a polycarbonate resin having a weight average molecular weight of 5,000 to 50,000 and about 0.01 to 1 mole-% of a transesterification catalyst and about 0.1 to 5 mole-% of an aromatic polycarboxylic acid and about 0.1 to 5 mole-% of at least one member selected from the group consisting of diarylcarbonates and oligocarbonates, wherein said percent is relative to the molar amount of aromatic carbonate structural units

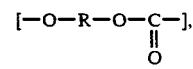

in which —O—R—O— is a diphenolate residue and processing said composition to foam moldings by extrusion at temperatures from 220° C. to 320° C. without application of a vacuum to form foamed molded articles or by injection molding at temperatures from 190° C. to 320° C.

9. The process of claim 8 wherein said composition further contains at least one member selected from the group consisting of reinforcing materials, nucleating agents, flame-retardants, mold release agents, dyes, pigments, heat stabilizers, UV stabilizers and hydrolysis stabilizers.

10. The process of claim 8, wherein composition further contains a thermoplastic material selected from the group consisting of ABS, polyolefin, polyalkylene terephthalate, SAN and graft copolymers.

11. The process of claim 8 wherein said composition further contains an impact strength modifier in an amount of up to 10% by weight, based on the weight of the polycarbonate.

12. A process for foaming thermoplastic aromatic polycarbonates, comprising mixing a thermoplastic polycarbonate resin having a weight average molecular weight of 5000 to 50,000 at temperatures from 220° C. to 320° C. with about 0.01 to 1 mole-% of a transesterification catalyst and with about 0.1 to 5 mole-% of an aromatic polycarboxylic acid and with about 0.1 to 5 mole-% of at least one member selected from the group consisting of aliphatic hydroxy carboxylic acids and aliphatic polyhydric alcohols to obtain a composition said percent being relative to the molar amount of aromatic carbonate structural units of the formula

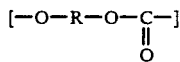

wherein —O—R—O— denotes a diphenolate group, and the composition is then worked up into molded foam articles by injection molding or extrusion at temperatures from 220° C. to 320° C., reaction times of from 0.5 minutes to 5 minutes being observed.

13. The process of claim 12 wherein said composition further contains at least one member selected from the group consisting of reinforcing materials, nucleating agents, flame-retardants, mold release agents, dyes, pigments, heat stabilizers, UV stabilizers and hydrolysis stabilizers.

14. The process of claim 12 wherein said composition further contains an additional thermoplastic material selected from the group consisting of ABS, polyolefin polyalkylene terephthalate, SAN and graft copolymers.

15. The process according to claim 13, characterized in that impact strength modifiers in quantities of up to 10% by weight, based on the weight of the polycarbonates, are added to the composition before foaming.

* * * * *